United States Patent
Smith et al.

(10) Patent No.: US 11,256,502 B2
(45) Date of Patent: Feb. 22, 2022

(54) AUTOMATIC GENERATION OF DOCUMENTATION AND AGGREGATION OF COMMUNITY CONTENT

(71) Applicant: Affirm, Inc., San Francisco, CA (US)

(72) Inventors: Adam Smith, San Francisco, CA (US); Tarak Upadhyaya, San Francisco, CA (US); Juan Lozano, San Francisco, CA (US); Daniel Hung, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 0 days.

(21) Appl. No.: 16/664,277

(22) Filed: Oct. 25, 2019

(65) Prior Publication Data

US 2020/0133662 A1    Apr. 30, 2020

Related U.S. Application Data

(60) Provisional application No. 62/750,265, filed on Oct. 25, 2018.

(51) Int. Cl.
*G06F 8/73*     (2018.01)
*G06F 9/54*     (2006.01)
*G06N 5/04*     (2006.01)
*G06N 20/00*    (2019.01)

(52) U.S. Cl.
CPC .............. *G06F 8/73* (2013.01); *G06F 9/54* (2013.01); *G06N 5/04* (2013.01); *G06N 20/00* (2019.01)

(58) Field of Classification Search
CPC .. G06F 8/73; G06F 9/54; G06N 20/00; G06N 5/04
See application file for complete search history.

(56) References Cited

U.S. PATENT DOCUMENTS

| | | | | |
|---|---|---|---|---|
| 6,185,591 B1 * | 2/2001 | Baker | ............. | G06F 40/166 715/210 |
| 7,110,936 B2 * | 9/2006 | Hiew | ............. | G06F 8/34 703/22 |
| 7,788,640 B2 * | 8/2010 | Grimaldi | ............. | G06F 8/73 717/123 |
| 8,181,157 B2 * | 5/2012 | Ericsson | ............. | G06F 8/73 717/123 |
| 9,489,217 B2 * | 11/2016 | Komarov | ............. | G06F 8/73 |

(Continued)

OTHER PUBLICATIONS

Loyola et al., "Content Aware Source Code Change Description Generation" (Year: 2018).*

(Continued)

*Primary Examiner* — Phillip H Nguyen
(74) *Attorney, Agent, or Firm* — Burr & Forman, LLP

(57) ABSTRACT

A system and method may provide assistance to programmers related to the creation of documentation. In some aspects, the system may automatically generate documentation-related text in source code. In other aspects, the system may automatically detect the need for the programmer to edit long-from documentation when changes are detected in code. Moreover, the system may provide for the aggregation or creation of documentation content based on one or more data sources, such as by embedding links to those data sources into documentation. In some aspects, some components of the system are based on machine learning methods and are trained on collected data.

7 Claims, 11 Drawing Sheets

(56) References Cited

U.S. PATENT DOCUMENTS

| | | | | |
|---|---|---|---|---|
| 10,481,879 | B2* | 11/2019 | Stevens | G06F 8/35 |
| 10,635,855 | B1* | 4/2020 | Schroeder | G06F 40/169 |
| 2003/0037312 | A1* | 2/2003 | Czech | G06F 8/42 |
| | | | | 717/120 |
| 2005/0216891 | A1* | 9/2005 | Sundararajan | G06F 8/73 |
| | | | | 717/123 |
| 2006/0143594 | A1* | 6/2006 | Grimaldi | G06F 8/73 |
| | | | | 717/123 |
| 2008/0263518 | A1* | 10/2008 | Bank | G06F 8/33 |
| | | | | 717/120 |
| 2013/0074036 | A1* | 3/2013 | Brandt | G06F 8/33 |
| | | | | 717/113 |
| 2014/0007068 | A1* | 1/2014 | Cullen | G06F 16/11 |
| | | | | 717/169 |
| 2016/0042275 | A1* | 2/2016 | Dettman | G06N 5/003 |
| | | | | 706/46 |
| 2018/0060067 | A1* | 3/2018 | He | G06F 11/3612 |
| 2018/0067836 | A1* | 3/2018 | Apkon | G06F 8/73 |
| 2019/0034210 | A1* | 1/2019 | Palladino | G06F 9/54 |
| 2019/0243617 | A1* | 8/2019 | Stevens | G06F 8/42 |
| 2019/0303107 | A1* | 10/2019 | Kelly | G06N 20/20 |

OTHER PUBLICATIONS

Buse et al., "Automatically Documenting Program Changes" (Year: 2010).*

Barone et al., "A parallel corpus of Python functions and documentation strings for automated code documentation and code generation" (Year: 2017).*

Cabot, "Automated Docstring Generation for Python Functions" (Year: 2014).*

Zanoni et al., "A Semi-Automatic Source Code Documentation Method for Small Software Development Teams" (Year: 2011).*

Loper, "Epydoc: API Documentation Extraction in Python" (Year: 2008).*

Zheng et al., "Auto-Documenation for Software Development" (Year: 2017).*

Purdon, "OpenPolarServer (OPS)—An Open Source Spatial Data Infrastructure for the Cryosphere Community" (Year: 2014).*

Chen et al., "Tracking Down Dynamic Feature Code Changes Against Python Software Evolution" (Year: 2016).*

* cited by examiner

AUTOMATIC GENERATION OF DOCUMENTATION AND AGGREGATION OF COMMUNITY CONTENT

CROSS-REFERENCE TO RELATED APPLICATIONS

This application claims the benefit of U.S. Provisional Patent Application No. 62/750,265, filed Oct. 25, 2018, which is hereby incorporated by reference in its entirety.

FIELD OF INVENTION

The present disclosure relates generally to methods and systems for creating, updating, and referencing code documentation during programming and development.

BACKGROUND

Programmers commonly write documentation for their source code during programming and development to make code more understandable. Documentation may explain how the code functions, why certain implementations were chosen, and what the code may be used for. Documentation is commonly created contemporaneously with code development.

However, the current process for creating documentation requires manual input by the programmer and is time consuming. Moreover, it is burdensome for programmers to update the documentation as the code changes.

SUMMARY

In some embodiments, a programming co-pilot system is provided that may integrate with a code editor. The programming co-pilot system may provide functionality such as docstring generation, documentation checking, content embedding, documentation generation, and documentation auto-searching.

Some embodiments relate to a computer-implemented method for docstring generation. The programming co-pilot system may retrieve a portion of source code such as a function definition and identify one or more usage examples of the portion of source code. The usage examples may be used to infer types for one or more components of the portion of source code. A docstring may be generated for the portion of source code wherein the docstring includes at least the types of the components of the portion of source code. The docstring may be inserted in the portion of source code.

Some embodiments relate to a computer-implemented method for documentation checking. The programming co-pilot system may retrieve a portion of source code and receive one or more edits from a programmer. The portion of source code may be updated in response to the edits. The programming co-pilot system may receive a request from the programmer to check the portion of source code in to a source code repository. The programming co-pilot system may detect changes to one or more code entities in the portion of source code and identify one or more documentation corresponding to the changed code entities. The documentation may be loaded and displayed to the programmer. The programming co-pilot system may receive one or more edits to the documentation from the programmer. The edits may be stored.

In some embodiments, the programming co-pilot system may instead identify one or more code examples corresponding to the changed code entities. The code examples may be loaded and displayed to the programmer. The programming co-pilot system may receive one or more edits to the code examples from the programmer. The edits may be stored.

Some embodiments relate to a computer-implemented method for content embedding. A section of documentation for a code entity may be provided. The programming co-pilot system may embed in the section of documentation a plurality of references to online data sources. The online data sources may include content related to the code entity. The programming co-pilot system or another computer application, such as a web browser, may display the section of documentation. During display of the section of documentation, the content from the online data sources may be loaded in real-time.

Some embodiments relate to a computer-implemented method for documentation generation. Documentation may be provided for a software package. The programming co-pilot system may generate a new section of documentation for the software package. The new section of documentation may comprise a plurality of references to online data sources. The online data sources may include content related to the software package. The programming co-pilot system or another computer application, such as a web browser, may display the documentation. During display of the documentation, the content from the online data sources may be loaded in real-time.

Some embodiments relate to a computer-implemented method for documentation auto-searching. An online database comprising a plurality of code repositories, corresponding documentation, and corresponding issues may be provided. The programming co-pilot system may provide a user interface comprising at least one text entry field for searching issues about a code repository. The programming co-pilot system may receive an input from the user in the text entry field. While receiving input from the user, the programming co-pilot system may perform a search for related issues based on the input. The input may be incomplete. Also while receiving input from the user, the programming co-pilot system may display related issues found as a result of the search. Also while receiving input from the user, the programming co-pilot system may update the display of related issues to include new search results.

BRIEF DESCRIPTION OF THE DRAWINGS

The present disclosure will become better understood from the detailed description and the drawings, wherein.

DETAILED DESCRIPTION

Figure 1:
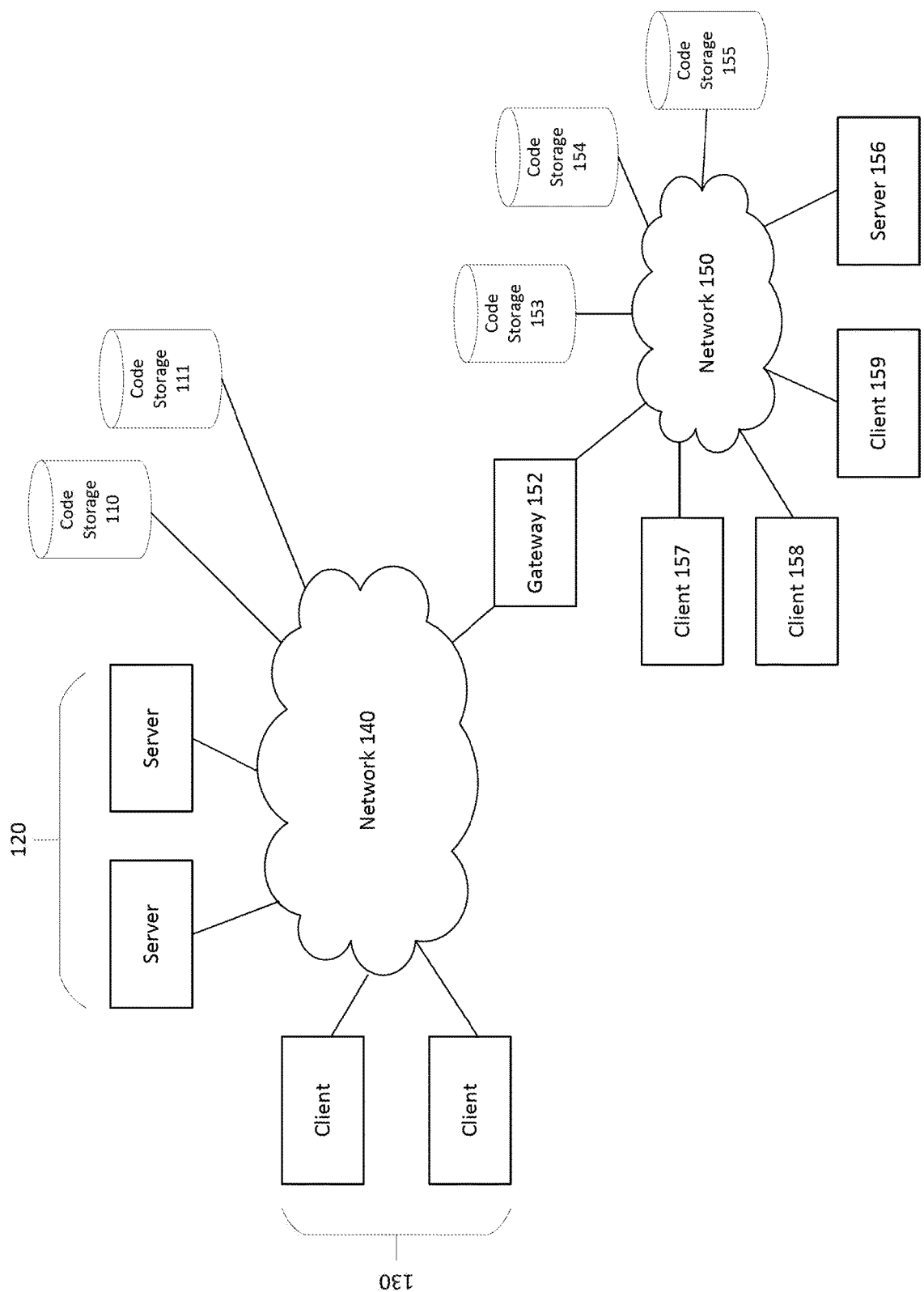
FIG. 1 illustrates an exemplary network environment that may be used in an embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a block diagram illustrating an exemplary network environment that may be used in an embodiment. The network environment may include one or more clients and servers connected via a network 140. The network 140 may include a local area network (LAN), a wide area network (WAN), a telephone network, such as the Public Switched Telephone Network (PSTN), an intranet, the Internet, or a combination of networks. The network may include external code storage 110, 111 that store computer code, such as source code. Some external code storage 110, 111 may be globally accessible to any entity on the network 140. Other external code storage 110, 111 may be private and require login-in and authentication to access. The network 140 may include various entities such as servers 120 and clients 130.

Local network 150 may connect to network 140 through gateway 152. In some embodiments, the local network 150 may be private and access controlled so that entities on the network 140 cannot generally access the resources on local network 140. However, entities on the local network 150 may access and share at least some of the resources on the local network 150. Code storage 153 may comprise code stored on the local network 150 after having been web scraped from external code sources 110, 111. Code storage 154 may exist on the local network 150 and may store code from a team of programmers working from clients 157, 158, 159 on the local network 150. In an embodiment, a code storage 155 is an individual code storage that stores code of just one of the programmers on the team. The code storage 155 may be separate from code storage 154 or may be, for example, a subset of code storage 154. Code storage may be any kind of storage. In some embodiments, a code storage comprise a codebase, which is a collection of code for building one or a set of software systems, applications, or software components. Moreover, in some embodiments, a codebase comprises a code repository, where a repository keeps track of changes in the codebase over time and may allow version control and allowing checking in and checking out of code. In some embodiments, code storage comprises a database. A database is any kind of storage and no particular type of database is required. For example, a database may comprise storage of files in memory or permanent storage. Server 156 may exist on the local network 150 and run a program comprised of code from the team of programmers. The code may be team code stored in code storage 154 or an individual branch or subset stored on code storage 155. Server 156 may generate logs or output during the execution of the program, and the logs or output may be retrieved by clients 157, 158, 159 for monitoring or debugging of the program.

Additional servers, clients, computer systems, and local networks may be connected to network 140. It should be understand that where the terms server, client, or computer system are used, this includes the use of networked arrangements of multiple devices operating as a server, client, or computer system. For example, distributed or parallel computing may be used.

Figure 2A:
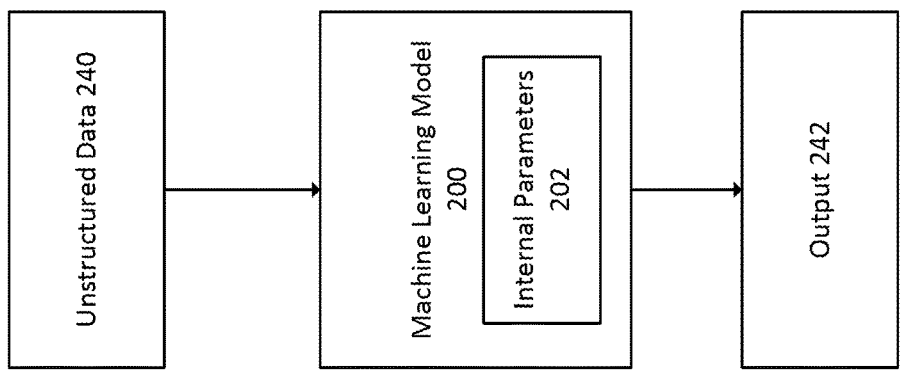
FIG. 2A illustrates an exemplary machine learning model that may be used in an embodiment.
Figure 2A:
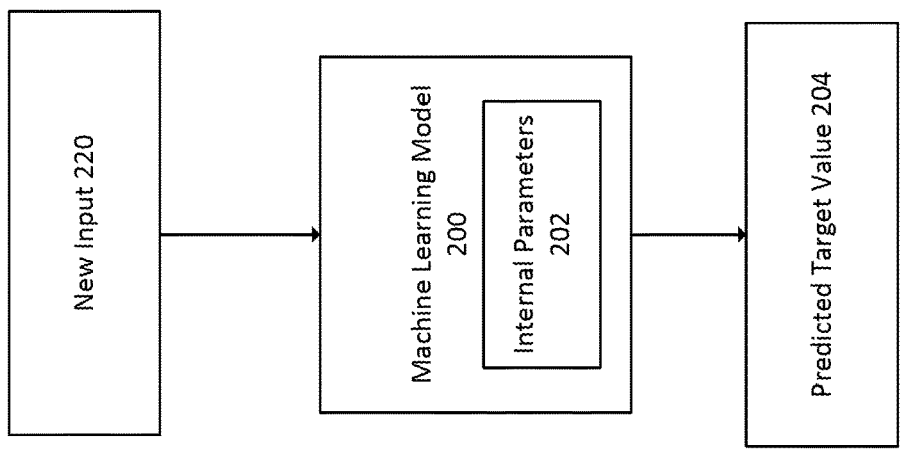
Figure 2A:
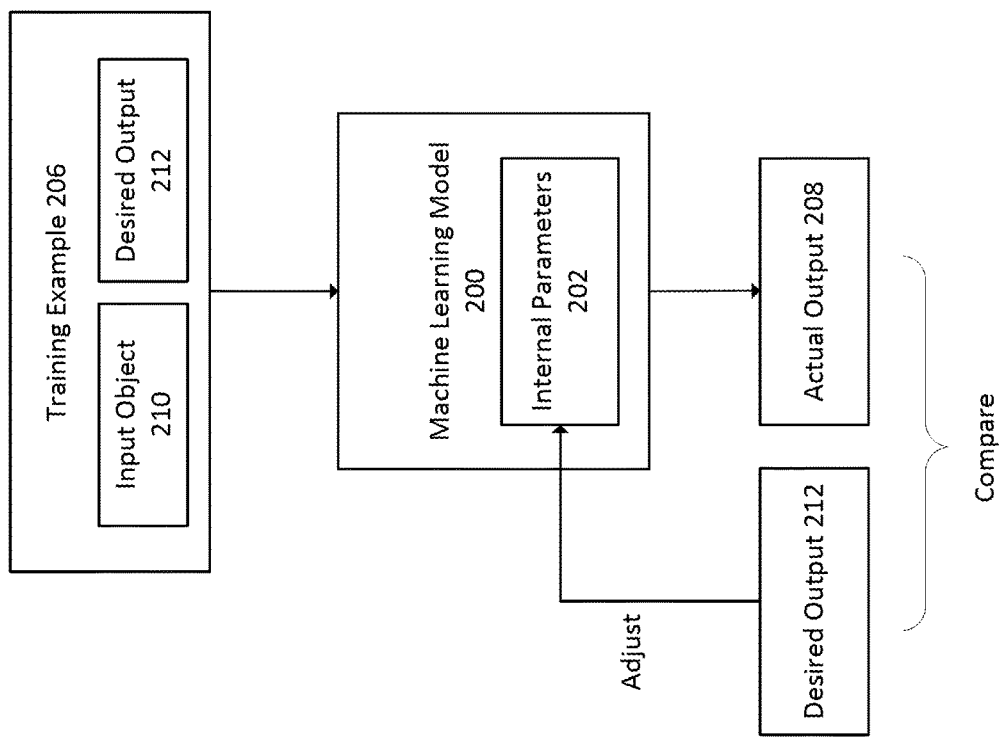

FIG. 2A illustrates an exemplary machine learning model 200. A machine learning model 200 may be a component, module, computer program, system, or algorithm. Some embodiments herein use machine learning for code completion, predictive editing, or predictive navigation. Machine learning model 200 may be used as the model to power those embodiments described herein. Machine learning model 200 is trained with training examples 206, which may comprise an input object 210 and a desired output value 212. The input object 210 and desired object value 212 may be tensors. A tensor is a matrix of n dimensions where n may be any of 0 (a constant), 1 (an array), 2 (a 2D matrix), 3, 4, or more.

The machine learning model 200 has internal parameters that determine its decision boundary and that determine the output that the machine learning model 200 produces. After each training iteration, comprising inputting the input object 210 of a training example in to the machine learning model 200, the actual output 208 of the machine learning model 200 for the input object 210 is compared to the desired output value 212. One or more internal parameters 202 of the machine learning model 200 may be adjusted such that, upon running the machine learning model 200 with the new parameters, the produced output 208 will be closer to the desired output value 212. If the produced output 208 was already identical to the desired output value 212, then the internal parameters 202 of the machine learning model 200 may be adjusted to reinforce and strengthen those parameters that caused the correct output and reduce and weaken parameters that tended to move away from the correct output.

The machine learning model 200 output may be, for example, a numerical value in the case of regression or an identifier of a category in the case of classifier. A machine learning model trained to perform regression may be referred to as a regression model and a machine learning model trained to perform classification may be referred to as a classifier. The aspects of the input object that may be considered by the machine learning model 200 in making its decision may be referred to as features.

After machine learning model 200 has been trained, a new, unseen input object 220 may be provided as input to the model 200. The machine learning model 200 then produces an output representing a predicted target value 204 for the new input object 220, based on its internal parameters 202 learned from training.

Machine learning model 200 may be, for example, a neural network, support vector machine (SVM), Bayesian network, logistic regression, logistic classification, decision tree, ensemble classifier, or other machine learning model. Machine learning model 200 may be supervised or unsupervised. In the unsupervised case, the machine learning model 200 may identify patterns in the data without training examples 206.

A neural network may be comprised of a plurality of neural network nodes, where each node includes input values, a set of weights, and an activation function. The neural network node may calculate the activation function on the input values to produce an output value. The activation function may be a non-linear function computed on the weighted sum of the input values plus an optional constant. In some embodiments, the activation function is logistic, sigmoid, or a hyperbolic tangent function. Neural network nodes may be connected to each other such that the output of one node is the input of another node. Moreover, neural network nodes may be organized into layers, each layer comprising one or more nodes. An input layer may comprise the inputs to the neural network and an output layer may comprise the output of the neural network. A neural network may be trained and update its internal parameters, which comprise the weights of each neural network node, by using backpropagation.

A convolutional neural network (CNN) may be used in some embodiments and is one kind of neural network and machine learning model. A convolutional neural network may include one or more convolutional filters, also known as kernels, that operate on the outputs of the neural network layer that precede it and produce an output to be consumed by the neural network layer subsequent to it. A convolutional filter may have a window in which it operates. The window may be spatially local. A node of the preceding layer may be connected to a node in the current layer if the node of the preceding layer is within the window. If it is not within the window, then it is not connected. A convolutional neural network is one kind of locally connected neural network, which is a neural network where neural network nodes are connected to nodes of a preceding layer that are within a spatially local area. Moreover, a convolutional neural network is one kind of sparsely connected neural network, which is a neural network where most of the nodes of each hidden layer are connected to fewer than half of the nodes in the subsequent layer.

A recurrent neural network (RNN) may be used in some embodiments and is one kind of neural network and machine learning model. A recurrent neural network includes at least one back loop, where the output of at least one neural network node is input into a neural network node of a prior layer. The recurrent neural network maintains state between iterations, such as in the form of a tensor. The state is updated at each iteration, and the state tensor is passed as input to the recurrent neural network at the new iteration.

In some embodiments, the recurrent neural network is a long short-term (LSTM) memory neural network. In some embodiments, the recurrent neural network is a bi-directional LSTM neural network.

A feed forward neural network is another type of a neural network and has no back loops. In some embodiments, a feed forward neural network may be densely connected, meaning that most of the neural network nodes in each layer are connected to most of the neural network nodes in the subsequent layer. In some embodiments, the feed forward neural network is a fully-connected neural network, where each of the neural network nodes is connected to each neural network node in the subsequent layer.

Neural networks of different types or the same type may be linked together into a sequential or parallel series of neural networks, where subsequent neural networks accept as input the output of one or more preceding neural networks. The combination of multiple neural networks may comprise a single neural network and may be trained from end-to-end using backpropagation from the last neural network through the first neural network.

Figure 2B:
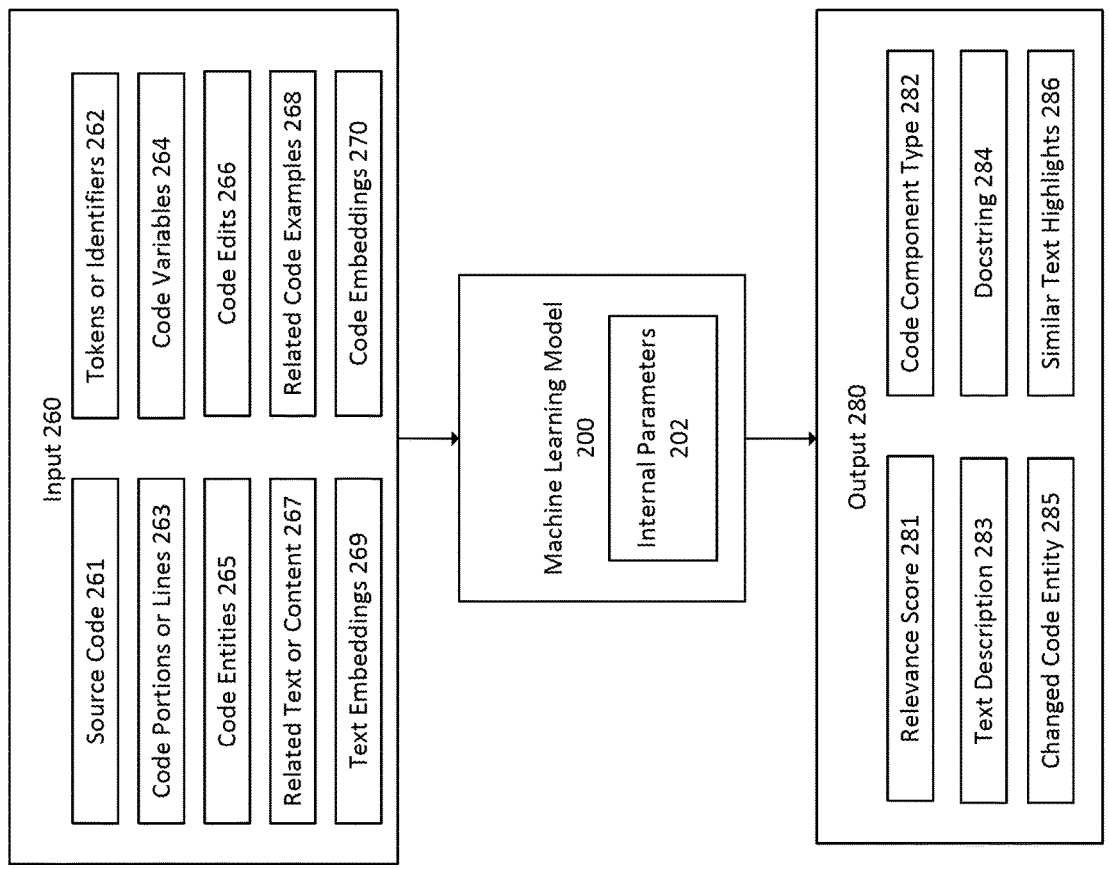
FIG. 2B illustrates an exemplary use of a machine learning model.

FIG. 2B illustrates use of the machine learning model 200 to perform inference on input 260 comprising data relevant to a programming co-pilot system 340. Input 260 may comprise any of source code 261, tokens or identifiers 262, code portions or lines 263, code variables 264, code entities 265, code edits 266, related text or content 267 that relates to source code 261, related code examples 268 that relates to source code 261, text embeddings 269, code embeddings 270, or other data. The machine learning model 200 performs inference on the data based on its internal parameters 202 that are learned through training. The machine learning model 200 generates an output 280 comprising information or data relevant to comparing, creating, editing documentation such as a relevance score 281, code component type 282, text description 283, docstring 284, changed code entity 285, or similar text highlights 286.

Figure 3:
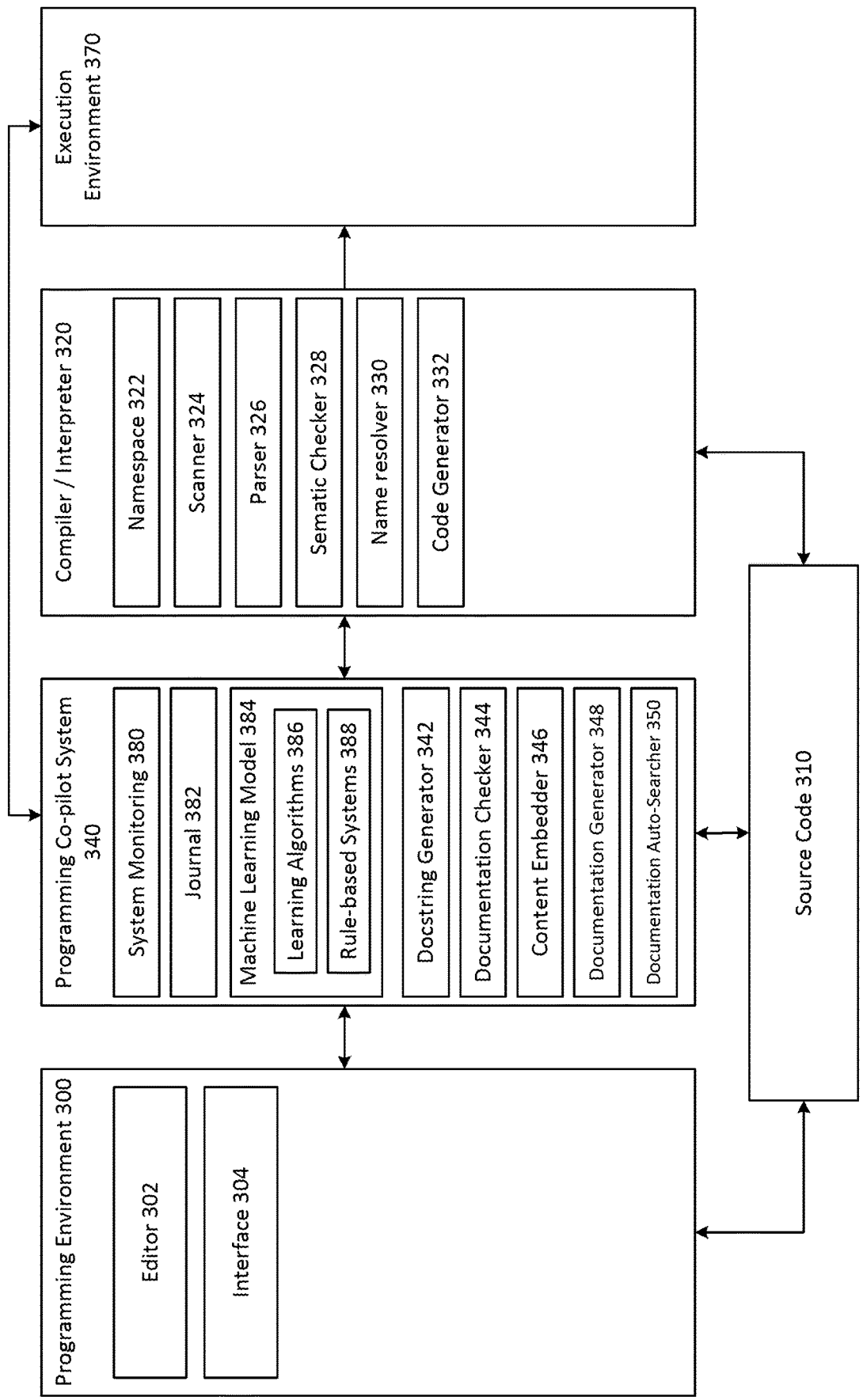
FIG. 3 illustrates an exemplary system for software development.

FIG. 3 illustrates an exemplary system for software development. Source code 310 may be provided and edited in a programming environment 300. The programming environment may allow interactive editing of the source code 310 by a user, such as a programmer. A programming environment may include an editor 302 and an interface 304. The editor 302 may provide for the developing, such as writing and editing, of source code 310. The interface 304 may present a human viewable or usable interface for using the editor 302. For example, the interface 304 may comprise a graphical user interface. Many different kinds of editor 302 may be used such as an integrated development environment (IDE), text editor, or command line. In some embodiments, an IDE such as Eclipse, Sublime, Atom, or Visual Studio may be used. In other embodiments, a shell or operating command line such as the Bash command line is used as a programming environment and may comprise an editor 302. In still other embodiments, single input interactive environments, such as Read-Eval-Print Loop (REPL), may be used as the editor 302.

A compiler or interpreter 320 may compile the code 310 into executable instructions or an intermediate representation, or interpret the source code 310 for execution. The compiler/interpreter 320 may comprise a namespace 322 that can be used to store symbols, such as identifiers and types, and to allow for name resolution 330. In some embodiments, the compiler/interpreter 320 may comprise a scanner 324, parser 326, semantic checker 328, name resolver 330, and code generator 332. Scanner 324 may accept as input the source code 310 and split expressions and language statements into tokens that can be processed by the parser 326 to determine the grammatical structure of a program. A token may be a single element of a programming language such as a constant, identifier, operator, separator, reserved word, or other element. In some embodiments, a token is atomic and is the smallest semantic unit of a programming language, such that the token cannot be broken down further into units with semantic meaning in the language. The parser 326 may parse the tokens and organize them according to a grammar of a programming language. In some embodiments, parser 326 builds a parse tree. Semantic checker 328 may perform semantic checking of a computer program and may identify and throw errors that are semantic in nature. The name resolver 330 may resolve names in the parse tree to elements of the namespace 322. Code generator 332 may translate the parse tree, or other intermediate representation of the source code, into a target language. The target language may be executable instructions, such as a binary executable, or an intermediate language that may be interpreted for execution. In an execution environment 370, code may be executed, such as for testing or production.

Programming co-pilot system 340 may interact with the programming environment 300, compiler/interpreter 320, and execution environment 370 to provide programming assistance to the programmer. Programming co-pilot may include functionalities such as docstring generator 342, documentation checker 344, content embedder 346, documentation generator 348, documentation auto-searcher 350, and other features. Programming co-pilot system 340 may interface with the programming environment 300 through API calls, data streams, inter-process messages, shared data structures, or other methods. In some embodiments, the programming co-pilot 340 is a separate program from the programming environment 300. In other embodiments, the programming co-pilot is a sub-program or component of the programming environment 300.

An embodiment of a programming co-pilot system 340 and its various functionality will be described herein. The programming co-pilot system 340 may include various combinations of the features described herein. In some embodiments, it includes all the functionalities described herein, and, in other embodiments, it includes only a subset of the functionalities described.

Embodiments may operate on any kind of source code including imperative programming languages, declarative code, markup languages, scripting languages. and other code. For example, source code may be Python, Perl, PHP, Javascript, Java, C, C++, HTML, reStructuredText, Markdown, CSS, shell scripts (such as bash, zsh, etc.), and so on.

A. Generating Docstrings

Docstrings may comprise documentation text written directly in the source code 310. For example, a function definition may include a docstring which explains intended usage of the function and what parameters and return values are associated with the function. In another example, a class definition may include a docstring which explains one or more class members of the class. Docstrings may be included in the source code 310 as a literal string value, a commented line or lines, a function or class variable, or another expression. In some programming languages, special escape characters, escape sequences, or variables may be reserved in the language to allow a program author to specify a docstring. In other programming languages, the escape character or sequence for standard comment may be used by convention.

In an embodiment, programming co-pilot system 340 may include a docstring generator 342. The docstring generator 342 may monitor the programming environment 300 and the source code 310 to make or suggest improvements to docstrings in the source code 310. The improvements may include creating new docstrings for undocumented code, expanding existing docstrings with more information, or updating existing docstrings to reflect changes documented code. In some embodiments, output from the docstring generator 342 may be used to directly update docstrings in the source code 310. In some embodiments, output from the docstring generator 342 may be used to provide suggestions to a user, and user input may be combined with output from the docstring generator 342 to update docstrings in the source code 310. In an embodiment, the docstring generator 342 may also monitor the output of a program in execution environment 370 to determine behavior of the source code 310 and generate docstrings to document that runtime behavior. For example, the docstring generator 342 may detect that a function in the source code 310 throws an error of a certain type, and add the identity of the error and its type to the docstring of the function.

Figure 4:
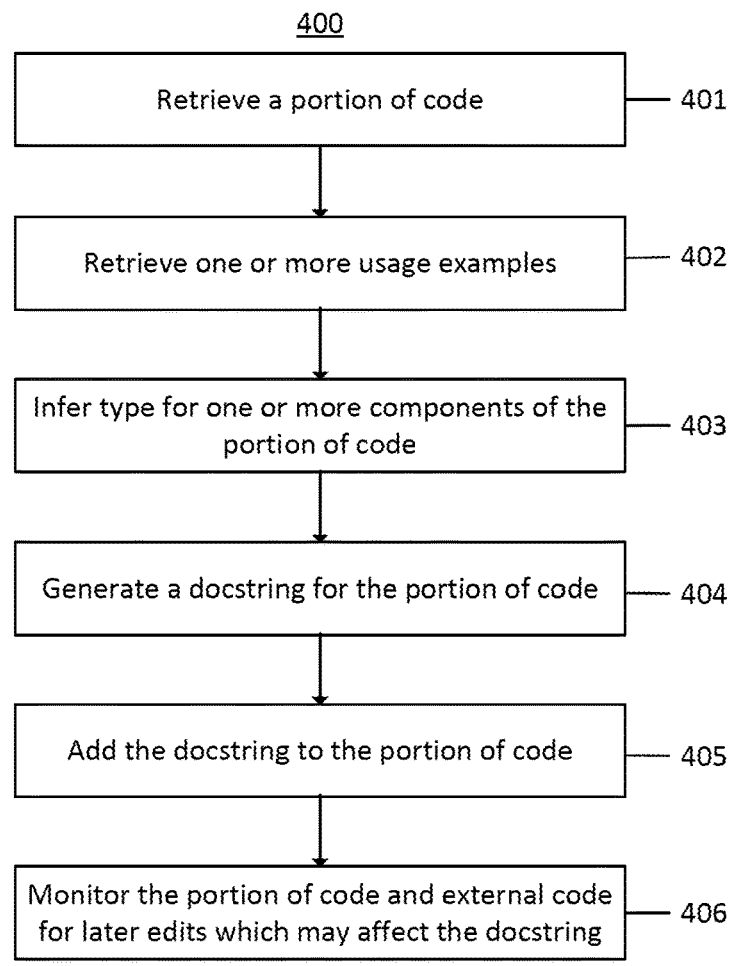
FIG. 4 illustrates an exemplary method of implementing docstring generation.

FIG. 4 illustrates an exemplary method 400 of implementing docstring generation. In step 401, a portion of code comprising at least a subset of source code 310 is retrieved. The portion of code may benefit from creation of a new docstring or expansion or update of an existing docstring. The portion of code may comprise a logical block, such as a function, a class, a module, or other logical block. The logical block may contain one or more code components such as function parameters, function return values, variables, class members, or other code components. The code portion may be written in a dynamically-typed language wherein code components may not have a statically defined type.

In step 402, one or more usage examples may optionally be retrieved. Each usage example may comprise one or more lines of code where the portion of code is referenced. For example, one usage example may comprise a function call, a class instance initialization, a class variable assignment, a module import, or other reference. Usage examples may be retrieved from the source code 310 or one or more external code samples received from the user. In some embodiments, usage examples may be retrieved by scanning the source code 310 for an identifier associated with the logical block in the code portion and retrieving one or more lines of code which around the identifier. For example, the identifier may comprise a function name, class name, or module name. In an embodiment, the number of lines retrieved in each usage example may be a fixed window around the identifier. In an embodiment, the number of lines retrieved in each usage example may be dynamically determined using a rules-based system or a machine learning model. For example, a rules-based system may capture all lines in the same indented or bracketed functional code block. In another example, a machine learning model 200 may be used to predict a relevance score for each line surrounding the identifier, and lines with relevance score above a threshold may be retrieved.

In step 403, types may be inferred for one or more code components of the portion of code. Types may include integer, float, double, Boolean, char, string, array, list, set, dictionary, objects, or other types. The code components may include function parameters, function return values, variables, class members, or other code components. The usage examples retrieved in step 402 may be used as input for inference. The code portion itself may also be analyzed as input for inferring types. For example, the way input parameters are used in the code portion (such as when the code portion is a function) and variables that are returned or used to generate the return value may all be used to infer types for components of the code portion.

In some embodiments, types may be inferred using static analysis. Static analysis comprises analysis of computer programs which is performed by analyzing the program source code and without executing the program. In one embodiment, a rules-based system may be applied to the source code 310 or the usage examples to infer type. For example, rules may be specified assigning types to literal expressions such as numbers (e.g., 1, 2, 3), characters (e.g., 'a', 'b', 'c') or strings (e.g., "abc"). Then, rules may be specified which assign types to code components based on the type of literal expressions the code components are initialized with. In another example, a rules-based type inference algorithm such as the Hindley-Milner algorithm may be applied.

In another embodiment, a machine learning model 200 using a learning algorithm may be applied to the source code 310 or the usage examples to predict type for the code components. For example, a machine learning model may be trained which predicts type using a plurality of input features such as tokens in the portion of code, tokens in the usage examples, variables or entities assigned to the code component, the identifier of the logical block, or an identifier associated with the code component such as a parameter name, return value expression, class variable name, or other identifier. In an embodiment, the machine learning model may be a neural network. In an embodiment, the input features may be transformed by the machine learning model 200. For example, the portion of code or usage examples may be represented as a bag-of-tokens vector, wherein each index of the bag-of-tokens vector is associated with a unique token and the value at each index corresponds to the count of appearances of that token. In another example, tokens or identifiers may be converted to pre-computed embedding vectors. The embedding vectors may be computed such that tokens or identifiers used in similar contexts have embedding vectors which are close together.

In some embodiments, type may be inferred using dynamic analysis. Dynamic analysis comprises analysis of computer programs which is performed during program execution. For example, one or more of the usage examples may be executed to determine an evaluated type for the code components in each usage example.

In an embodiment, the evaluated type for a code component may vary across usage examples. When a conflict occurs, a type which is more general may be inferred. In one example, float may be inferred for a code component which evaluated as a float in a first usage example but evaluated as an int in a second usage example. In another example, collection or iterable may be inferred for a code component which evaluated as a list in a first usage example but evaluated as a set in a second usage example. In an embodiment, the usage examples may not cover all possible evaluated types for the code components. The evaluated types may be used as a test for types inferred through static analysis. For example, a conjectured type inferred for one code component through static analysis may be checked to ensure the conjectured type is a super type, parent type, or otherwise more general than all evaluated types for the code component.

In some embodiments, one or more additional descriptions of the code portion may be generated for the docstring. The additional descriptions may comprise one or more keywords or phrases relevant to the code portion, relevant to a subset of the code portion, or relevant to a code component in the code portion. For example, an example code portion may include a first identifier "requests.get" referring to a function which retrieves data from a URL and a second identifier "requests.Response.json" referring to a class which captures JSON data. An example additional description may be generated which reads "get JSON data from URL".

In an embodiment, the additional descriptions may be extracted based on tokens in the code portion and additional documents. For example, one or more tokens representing one or more code entities such as functions, classes, or variables may be identified. Identification of code entities may be performed with static analysis, dynamic analysis, or by a machine learning model 200. One or more documents related to at least one of the tokens may be retrieved from a database. The documents may comprise docstrings, other documentation, question and answers, tutorials, or other information about code. One or more keywords or phrases may be extracted from the documents for adding to the docstring. The extraction of keywords or phrases may be performed by using a machine learning model 200.

In an embodiment, the additional descriptions may be generated using a machine learning model 200. For example, an encoder-decoder neural network may be used. The encoder-decoder neural network may comprise an encoder network and a decoder network. The encoder network may comprise an RNN which takes in a sequence of tokens from the code portion and outputs an embedding vector. The sequence of tokens may be transformed prior to being input to the encoder network. The decoder network may comprise an RNN which takes in the embedding vector and generates a sequence of text which may be used as an additional description.

In step 404, a docstring is generated for the code portion. The docstring may include one or more code components of the code portion and the type inferred for each code component. For example, when the code portion comprises a function, the docstring may include an identifier and type for each parameter of the function and a type for each return value of the function. The additional descriptions of the code portion, created as described above, may also be added to the docstring. In an embodiment, the docstring may be generated using a template. The template may comprise a default template or a user provided template.

In step 405, the docstring may be added to the code portion. The code portion may be modified by inserting the docstring at a default position, at a user selected position, or at a position based on a default or user provided template. The code portion may be modified by replacing some of the code portion with the docstring. For example, a pre-existing docstring in the code portion may be replaced by the docstring. The code portion may be modified by selectively combining the docstring with the code portion. For example, a difference algorithm may be applied to the code portion and the docstring which allows one or more new parts of the docstring to be included without replacing all of a pre-existing docstring in the code portion. Modifications to the code portion may be applied or replicated in the source code 310. In some embodiments, the docstring may be presented to the user prior to inclusion in the code portion, and user input may be requested. User input may be used to modify the docstring prior to inclusion in the code portion. In an embodiment, user input may be used to cancel inclusion of the docstring in the code portion. In some embodiments, user input may be saved and used as training data for a machine learning model 200 used in future iterations of step 404.

In step 406, optionally, the source code 310 may be monitored for later edits to the code portion. When a later edit is detected, an updated docstring may be generated to reflect the later edits. When an updated docstring is generated, step 405 may be repeated to add the updated docstring to the code portion. In an embodiment, the updated docstring may be generated by repeating steps 402-404 on the code portion. In an embodiment, the updated docstring may be generated using a machine learning model 200 which takes the later edits and the docstring as inputs, and outputs the updated docstring.

In some embodiments, external code outside the code portion may also be monitored for later edits which affect the code portion. External code may comprise code in the source code 310 not included in the code portion or code outside of source code 310 such as an external library or application programming interface (API).

In an example, a function defined in the code portion may be a wrapper function which returns output based on a call to an external function defined in external code. When a return type of the external function changes, the return type of the function defined in the code portion may be affected. For example, if the return value of the function is dependent on the return value of the external function, then a change to the return type of the external function may change the return value of the function in the code portion.

In another example, the code portion may comprise a front-end template written in a first programming language such as HTML, and the code portion may rely on information provided by an application programming interface or an external back-end library written in a second programming language such as Python. When a change is made to the external back-end library, the code portion may be affected, and an updated docstring may be necessary. When an edit is detected to external code that affects the code portion, a machine learning model 200 determines a change to the docstring to account for the edit to the external code. The machine learning model 200 generates an updated docstring based on the change to the external code and may add it to the code portion.

B. Automatic Checking for Necessary Changes to Documentation

In an embodiment, programming co-pilot system 340 may include a documentation checker 344. The documentation checker 344 may monitor programming environment 300, source code 310, and external files to alert a user when documentation should be updated. Documentation may comprise docstrings, tutorials, readme's, reference documentation, long-form documentation, code examples, or other documentation. Documentation may comprise descriptive text or executable code. Documentation may be stored in the same location as source code 310 or in a different folder of the same project or repository as source code 310.

Figure 5A:
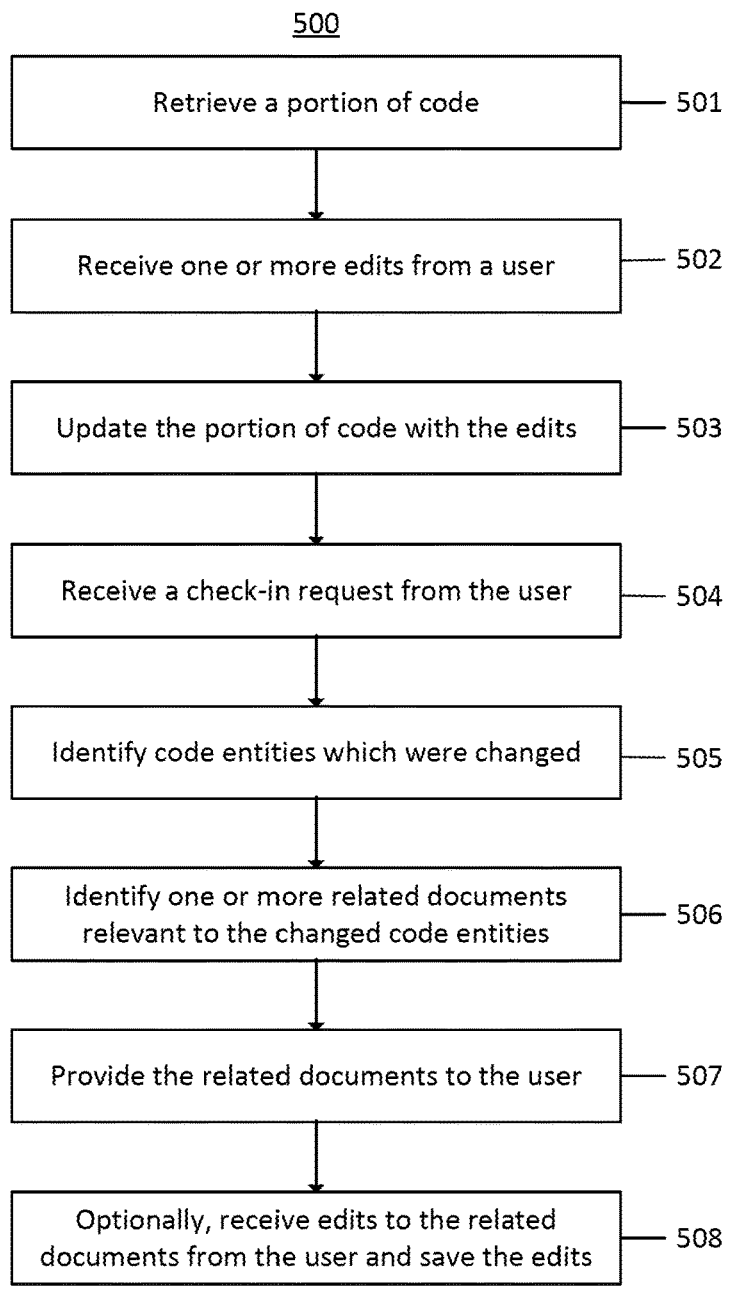
FIG. 5A illustrates an exemplary method of implementing documentation checking.

FIG. 5A illustrates an exemplary method 500 of implementing documentation checking for descriptive text documentation. In step 501, a portion of code comprising at least a subset of source code 310 is retrieved. The portion of code may be displayed for a user. For example, the portion may be displayed in editor 302 or interface 304. In step 502, one or more edits is received from the user. For example, edits may be received through the editor 302 or interface 304. In step 503, in response to receiving edits from the user, the portion of code is updated. For example, edits may be inserted in the portion of code at the current location of a cursor. In step 504, a request is received to check the code portion in to a source code repository. The source code repository may comprise a repository managed by a version control system such as Git, Subversion, or other version control system.

In step 505, code entities which have changed are identified. Code entities may comprise functions, classes, variables, or other entities in the code portion. In an embodiment, changed code entities may be identified by reviewing the edits received from the user. A code entity which had an edit applied to a line of code defining the code entity may be considered a changed code entity. For example, a function may be considered a changed code entity if definition of the function was edited. In an embodiment, a machine learning model 200 may be used to identify changed code entities. For example, a machine learning model may be trained which classifies a code entity as changed or not changed based on input such as the code entity definition and a list of edits.

In step 506, one or more related documents comprising descriptive text documentation relevant to the changed code entities is identified. The related documents may be likely candidates for review or editing to reflect changes in the changed code entities. In an embodiment, related documents may comprise documentation directly associated with the changed code entities. For example, a docstring included in the definition of the changed code entity may be directly associated. In another example, a long-form documentation text may be directly associated with a changed code entity by having the same name or being associated with the changed code entity in a database. In an embodiment, related documents may identified by finding documentation containing links to the changed code entity or documentation of the changed code entity. Links may comprise hyperlinks, citations, associations in a database, use of the name of the changed code entity, or other links. In an embodiment, related documents may be identified using named entity recognition. An entity recognizer comprising a machine learning model 200 which performs named entity recognition may be used. The entity recognizer may be trained to take in a text snippet and output whether the text snippet refers to a code entity and which code entity is referred to. The entity recognizer may be applied to documentation, and documentation which contains text snippets referring to a changed code entity may be identified as related documents. In an embodiment, related documents may be identified using a machine learning model 200. For example, a machine learning model 200 may be trained which takes in a code entity definition or docstring and a documentation text. The machine learning model may be trained to create semantic embeddings of the code entity definition or docstring and the documentation text. The machine learning model may return a similarity or relevance score by comparing the semantic embeddings. Documentation which has similarity score above a threshold value with a changed code entity definition may be identified as related documents.

In step 507, the related documents are provided to the user for editing. In an embodiment, a list of one or more of the related documents may be provided to the user. The list may include links to open the related documents for editing. The list may be provided through an email, a desktop notification, a website, a browser or application plug-in, a console message, or other communication mechanism. In an embodiment, the related documents may be directly opened in the editor 302 or interface 304. In some embodiments, one or more visual indications may be provided in the related documents to distinguish sections which are likely to be relevant. In an embodiment, the name of the changed code entities may be highlighted. In an embodiment, output or internal state from machine learning models used in step 506 may be used to highlight sections of text which influenced on the machine learning model output. In an embodiment, a separate machine learning model may be used which takes in a related document and a code entity definition, then outputs sections of the related document which are relevant to the code entity. In some embodiments, relevance may be determined by identifying sections that are textually similar to the content or keywords of the code entity. In step 508, optionally, edits to the related documents may be received and saved.

Figure 5B:
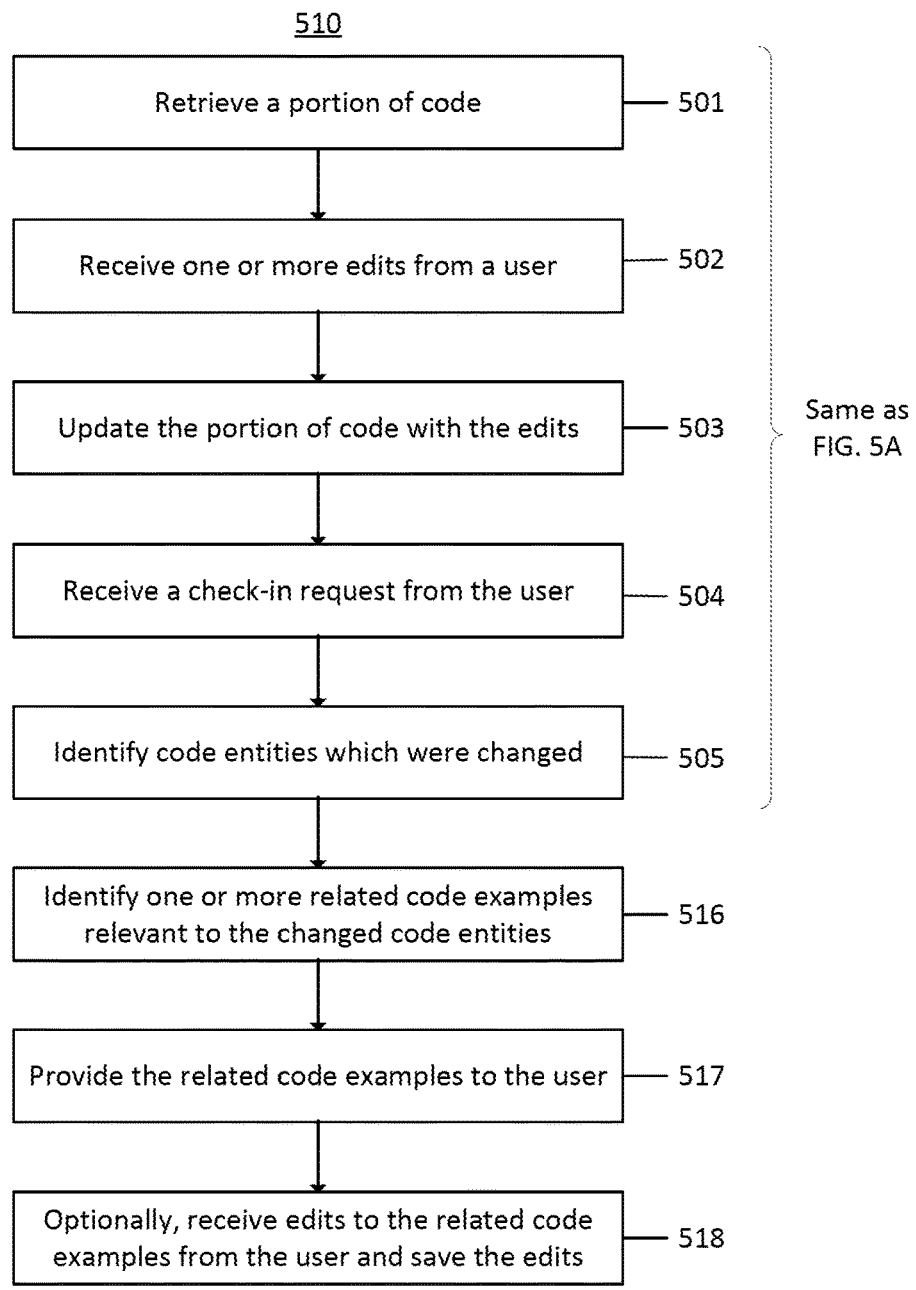
FIG. 5B illustrates another exemplary method of implementing documentation checking.

FIG. 5B illustrates an exemplary method 510 of implementing documentation checking for executable code documentation. Steps 501-505 are the same as in FIG. 5A. In step 516, one or more related code examples relevant to the changed code entities is identified. In an embodiment, static or dynamic analysis may be performed to identify code examples which use one or more changed code entities. Code examples which use one or more changed code entities may be identified as related code examples. In an embodiment, code examples could be scanned for the names of the changed code entities. Code examples containing the names of one or more changed code entities may be identified as related code examples.

In step 517, the related code examples are provided to the user for editing. In an embodiment, a list of one or more of the related code examples may be provided to the user. The list may include links to open the related code examples for editing. The list may be provided through an email, a desktop notification, a website, a browser or application plug-in, a console message, or other communication mechanism. In an embodiment, the related code examples may be directly opened in the editor 302 or interface 304. In some embodiments, one or more visual indications may be provided in the related code examples to distinguish sections which are likely to be relevant. In an embodiment, lines where the changed code entities are used as identified by static or dynamic analysis may be highlighted. In an embodiment, lines containing the names of the changed code entities may be highlighted. In step 518, optionally, edits to the related code examples may be received and saved.

C. Generating and Aggregating Related Content

In an embodiment, programming co-pilot 340 may include a content embedder 346. The content embedder 346 may automatically retrieve and embed a plurality of content into existing documentation. In an embodiment, the content embedder 346 may be used to include content which may be crowd-sourced or frequently updated and difficult to capture in statically written documentation. In an embodiment, the content may be embedded in reference documentation or long-form documentation. Reference documentation may comprise documentation describing the function or logic of each code component in a code entity. Reference documentation may be generated based on docstring documentation and may be stored in a separate directory from the source code 310. Content embedded in reference documentation may be relevant to operation of the code entity described by the reference documentation. For example, content embedded in reference documentation about a class may comprise code examples, bug reports, or issue reports related to the class or members of the class.

Long-form documentation may comprise documentation describing usage or implementation examples of code entities. Content embedded in long-form documentation may be relevant to the use case described by the long-form documentation. For example, content embedded in long-form documentation about a class may comprise tutorials, question and answers, or issue reports about using the class.

Figure 6:
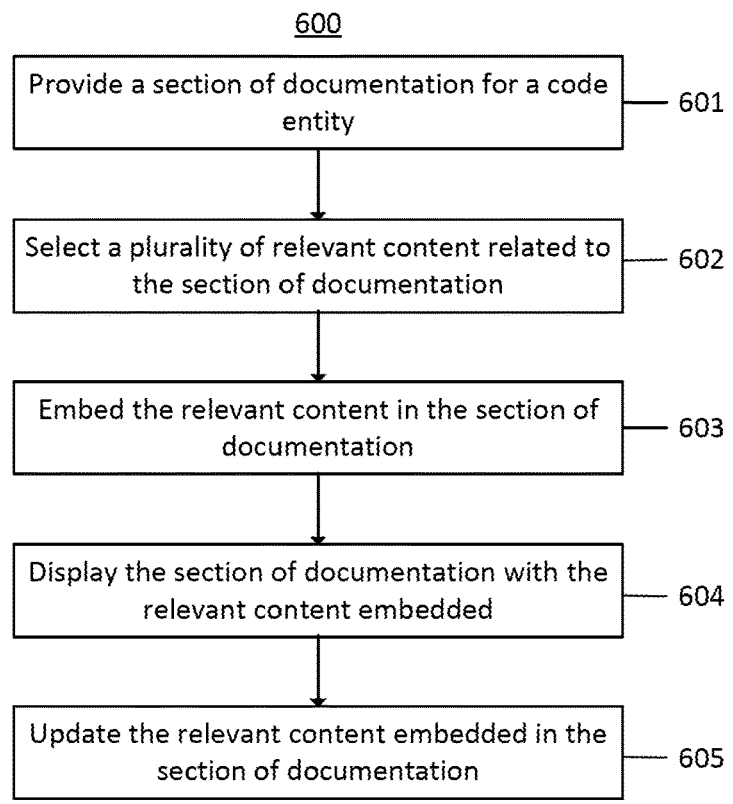
FIG. 6 illustrates an exemplary method of implementing content embedding.

FIG. 6 illustrates an exemplary method 600 of implementing content embedding. In step 601, a section of documentation for a code entity in source code 310 is provided. In an embodiment, the section of documentation may comprise reference documentation or long-form documentation. The code entity may comprise a function, class, variable, or other entity in source code 310. The code entity of a section of documentation may be identified using any of the methods described herein, such as the techniques identified in step 506 and elsewhere. For example, named entity recognition methods are one approach.

In step 602, a plurality of relevant content related to the section of documentation is selected. The relevant content may comprise tutorials, question and answers, bug reports, issue reports and responses, forum posts, mailing list messages, blog posts, code examples, or other content. The relevant content may be selected by reviewing a plurality of data sources and selecting content from the data sources based on relevance.

The data sources may include question and answer websites, blogs, other websites, issue trackers, code repositories, or other data sources. In an embodiment, the data sources may include a code examples directory or a tutorials directory in the same repository as the source code 310. In an embodiment, a list of data sources to be reviewed may be set by default values, provided by a web crawler, or provided by the user.

Relevance of content from the data sources may be determined by a rules-based system or a machine learning model 200 that uses a learning algorithm. In an embodiment, a rules-based system may comprise keyword matching between the section of documentation and the content from the data sources. In an embodiment, the machine learning model 200 may be trained with an unsupervised topic modeling algorithm such as Latent Dirichlet Allocation to take in a text input and output a topic vector. A topic vector of an item of content from the data sources may be compared to a topic vector of the section of documentation to produce a relevance score. In an embodiment, the machine learning model 200 may be trained to take in a representation of the section of documentation and a representation of the content from the data sources as inputs and output a relevance score.

In an example, relevant content may comprise a plurality of questions and answers from a crowd-sourced question and answer website such as StackOverflow. The questions and answers may comprise a subset of all question and answers on the website selected for relevance to the documentation. When a question and answer has a plurality of answers, a subset of the answers may be selected. For example, a most upvoted answer may be selected, or an answer accepted by a submitter of the question may be selected. The questions and answers may additionally be sorted by views, upvotes, or other metrics.

In another example, relevant content may comprise issue reports and responses from an issue tracker such as Github or Jira. The issue reports and responses may comprise a subset of all issue reports and responses on the issue tracker selected for relevance to the documentation. When an issue report has a plurality of responses, the responses may be summarized or a subset of responses may be selected based on relevance, views, upvotes, or other metrics. The issue reports and responses may additionally be sorted by views, upvotes, or other metrics.

In another example, relevant content may comprise code examples. The code examples may be extracted from a plurality of data sources. The code examples may be selected for relevance to the documentation by identifying the code entity as a keyword used in the code examples. The code examples may additionally be sorted by views, upvotes, or other metrics.

In step 603, the relevant content is embedded in the section of documentation. The relevant content may be inserted at a position based on default values, based on a template, based on a rules-based system, or based on user input. The relevant content may be embedded as a link or list of links, an applet or plug-in, an iframe, or another object or format which may reference content in the data sources. Because the content is embedded, it can be dynamically loaded when the documentation is loaded. In this way, it naturally updates automatically as the data sources are modified, rather than being a static copy.

In step 604, the section of documentation is displayed with the relevant content embedded. The section of documentation may be displayed in a website, in editor 302, in interface 304, or in another location. In some embodiments, the embedded content may be sorted by relevance. Moreover, in some embodiments, only the top N results are shown, for a value of N that is less than all of the results, and a "see more" button or link is provided to allow viewing additional results.

In step 605, the relevant content embedded in the section of documentation is automatically updated. Automatic updating may occur at a fixed interval, based on a real-time event or trigger such as an update to the data sources, based on a rules-based system, or based on another mechanism. For example, the order of question and answers, issue reports and responses, or code examples may be adjusted based on updated views, upvotes or other metrics. In another example, textual content may be updated based on edits made in the data source. For example, the answer text in a question and answer or the summary of responses to an issue report may be updated based on edits in the data source.

In an embodiment, the relevant content is an embedded link to other data sources. When the documentation is loaded, the link is followed to load the data from the data source as it exists at the time of access. Therefore, the documentation is automatically uploaded each time that it is accessed, or if the page is refreshed upon request by the user.

In an embodiment, when relevant content is automatically updated, new content may be selected in addition to or in replacement of the previously displayed content. For example, a new question and answer, issue report and response, code example or other new content may be selected due to having higher relevance to the section of documentation. In an embodiment, steps 602-604 may be repeated to select, embed, and display new content.

D. Generating and Aggregating Package Documentation

In an embodiment, programming co-pilot 340 may include a documentation generator 348. The documentation generator 348 may automatically retrieve a plurality of related and useful content to generate a new section of documentation. The content may provide additional context or additional information to users. In an embodiment, the document generator 348 may be used to capture content which may be crowd-sourced or frequently updated and difficult to capture in statically written documentation.

Figure 7:
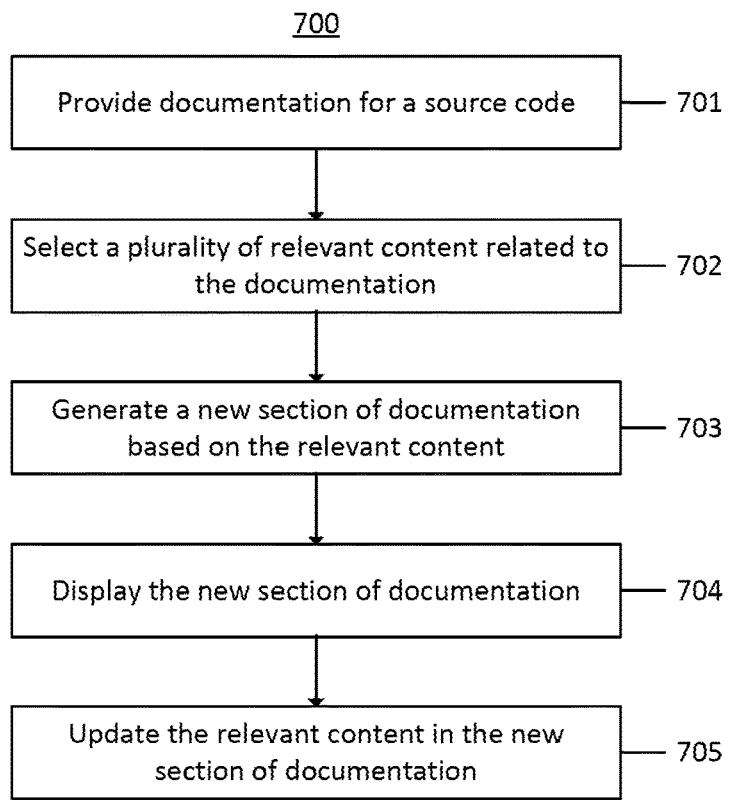
FIG. 7 illustrates an exemplary method of implementing documentation generation.

FIG. 7 illustrates an exemplary method 700 of implementing documentation generation. In step 701, documentation is provided for source code 310. The documentation may comprise one or more sections. The documentation and source code 310 may be stored in a repository.

In step 702, a plurality of relevant content related to the documentation is selected. The relevant content may comprise tutorials, question and answers, bug reports, issue reports and responses, forum posts, mailing list messages, blog posts, code examples, or other content. The relevant content may be selected by reviewing a plurality of data sources and selecting content from the data sources based on relevance.

The data sources may include question and answer websites, blogs, other websites, issue trackers, code repositories, or other data sources. In an embodiment, the data sources may include a code examples directory or a tutorials directory in the same repository as the source code 310. In an embodiment, a list of data sources to be reviewed may be set by default values, provided by a web crawler, or provided by the user.

Relevance of content from the data sources may be determined by a rules-based system or a machine learning model 200 using a learning algorithm. In an embodiment, a rules-based system may comprise keyword matching between the documentation and the content from the data sources. In an embodiment, the machine learning model 200 may be trained with an unsupervised topic modeling algorithm such as Latent Dirichlet Allocation to take in a text input and output a topic vector. A topic vector of an item of content from the data sources may be compared to a topic vector of the documentation to produce a relevance score. In an embodiment, the machine learning model 200 may be trained to take in a representation of the documentation and a representation of the content from the data sources as inputs and output a semantic similarity score.

In step 703, a new section of documentation is generated based on the relevant content. The new section may comprise a list of frequently asked questions, a list of tutorials, a list of known bugs, a gallery of example projects built using the source code 310, an installation guide, a quick-start guide, a list of helpful tips, or another section of documentation.

In an embodiment, the new section of documentation is an embedded version of the data sources and not a static copy. The new section of documentation may be inserted at a position based on default values, based on a template, based on a rules-based system, or based on user input. The new section of documentation may be embedded as a link or list of links, an applet or plug-in, an iframe, or another object or format which may reference content in the data sources. Because the content is embedded, it can be dynamically loaded when the documentation is loaded. In this way, it naturally updates automatically as the data sources are modified, rather than being a static copy.

In an example, an FAQ section of documentation may be generated comprising a list of frequently asked questions. The FAQ section may be generated based on relevant content comprising question and answers, issue reports, and questions submitted in mailing list messages. The FAQ section may include a limited number of top questions, wherein the top questions comprise a subset of the relevant content selected based on views, upvotes, or other metrics. The top questions may be ordered based on views, upvotes, or other metrics. The FAQ section may include links, citations, or other references to the data sources from which the relevant content was selected.

In an embodiment, the new section may be generated based on a default or user-provided template. For example, a template may comprise a set of data sources, a ranking metric, and a format specification. The new section may be generated by selecting a subset of the relevant content sourced from the set of data sources, ordering the subset of relevant content based on the ranking metric, and organizing the subset of relevant content based on the format specification. In an embodiment, a first machine learning model 200 may be applied which is trained to take in representations of the relevant content as input and output a plurality of clusters of similar related content. For example, a clustering algorithm such as K-means or DB-Scan may be applied to bag-of-words representations of text of each relevant content. Relevant content in one or more of the clusters may be compiled to generate the new section. In an embodiment, a second machine learning model 200 may be applied which is trained to take in one or more clusters as input and output the new section.

In step 704, the new section is displayed. The new section may be displayed in a website, in editor 302, in interface 304, or in another location.

In step 705, the relevant content in the new section is automatically updated. Automatic updating may occur at a fixed interval, based on a real-time event or trigger such as an update to the data sources, based on a rules-based system, or based on another mechanism. For example, the order of question and answers, issue reports and responses, or code examples may be adjusted based on updated views, upvotes or other metrics. In another example, textual content may be updated based on edits made in the data source. For example, the answer text in a question and answer or the summary of responses to an issue report may be updated based on edits in the data source.

In an embodiment, the relevant content in the section is an embedded link to other data sources. When the documentation is loaded, the link is followed to load the data from the data source as it exists at the time of access. Therefore, the documentation is automatically uploaded each time that it is accessed, or if the page is refreshed upon request by the user.

In an embodiment, when relevant content is automatically updated, new content may be selected in addition to or in replacement of the previously displayed content. For example, a new question and answer, issue report and response, code example or other new content may be selected due to having higher relevance to the documentation. In an embodiment, steps 702-704 may be repeated to select, embed, and display new content.

E. Auto-Searching Documentation

In an embodiment, programming co-pilot 340 may include a documentation auto-searcher 350. Documentation auto-searcher 350 may automatically retrieve a plurality of content from documentation or other data sources in response to a user query. In an embodiment, the auto-searcher 350 may perform a search and retrieve content prior to submission of the query by the user. The documentation auto-searcher may be used in a troubleshooting message board, troubleshooting forum, issues tracker, or other communication channel, to reduce the number of messages, questions, or issues which may already be answered by existing documentation, messages, or other content. By displaying existing content to the user that matches the query, the user may be discouraged from adding content that would be repetitive or redundant. In some embodiments, the auto-searcher 350 may perform its search concurrently with text entry from the user, so that searches may be performed when only a partial search string has been entered by the user and prior to the entire search string being entered.

Figure 8:
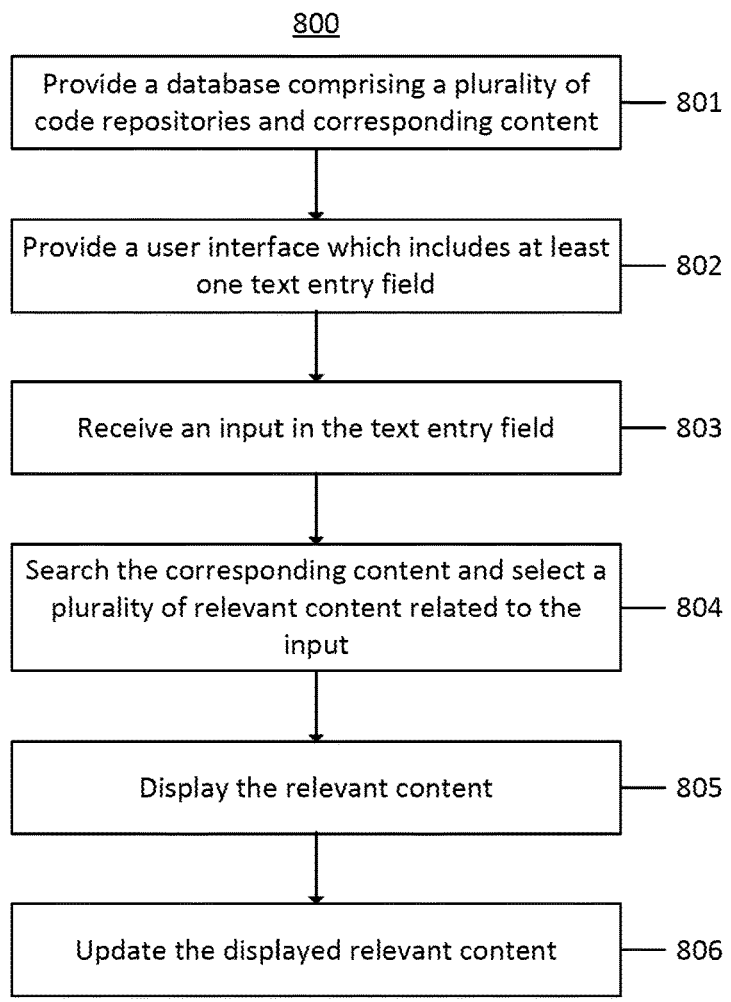
FIG. 8 illustrates an exemplary method of implementing documentation auto-searching.

FIG. 8 illustrates an exemplary method 800 of implementing documentation auto-searching. In step 801, a database comprising a plurality of code repositories and corresponding content is provided. The corresponding content may comprise documentation of the code repositories such as docstrings, tutorials, readme's, reference documentation, long-form documentation, code examples, or other documentation. The corresponding content may also comprise content external to the code repositories such as tutorials, question and answers, bug reports, issue reports and responses, forum posts, mailing list messages, blog posts, code examples, or other content. In an embodiment, at least a portion of the corresponding content may be crowd-sourced.

In step 802, a user interface is provided which includes at least one text entry field for searching for information about a code repository. In step 803, an input is received in the text entry field.

In step 804, concurrently with receiving the input, the corresponding content may be searched for content related to the input. A plurality of relevant content may be selected wherein the relevant content is at least a subset of the corresponding content. In an embodiment, the input may be partial or incomplete and the corresponding content may be searched based on the partial or incomplete input.

In an embodiment, the relevant content may be selected by determining relevance of each corresponding content to the input. Relevance of each corresponding content to the input may be determined by a rules-based system or a machine learning model 200 based on a learning algorithm. In an embodiment, a rules-based system may comprise keyword matching between the corresponding content and the input. In an embodiment, the machine learning model 200 may be trained with an unsupervised topic modeling algorithm such as Latent Dirichlet Allocation to take in a text input and output a topic vector. A topic vector of a corresponding content item may be compared to a topic vector of the input to produce a relevance score. In an embodiment, the machine learning model 200 may be trained which takes in a representation of corresponding content and a representation of the input and outputs a semantic relevance score.

In an embodiment, the relevant content may be selected by determining relevance of a portion or subset of each corresponding content to the input. In an example, a question portion of a question and answer may be compared to the input when determining relevance. In an embodiment, the relevant content selected may comprise a portion of each corresponding content. In an example, when a question and answer is relevant to the input, an answer portion of the question and answer may be selected as relevant content or an item linked in the answer portion may be selected as relevant content.

In an embodiment, a ranking or ordering may be determined for the relevant content. In an embodiment, the ranking may be determined based on user history metrics such as past clicks, upvotes, or other metrics. In an embodiment, the ranking may be determined based on relevance to the input.

In step 805, also concurrently with receiving the input, relevant content may be displayed in editor 302, interface 304, or another user interface. In an embodiment, the relevant content may be displayed in an order based on the ranking determined in step 804.

In step 806, also concurrently with receiving the input, the relevant content may be updated and displayed. In some embodiments, the relevant content may be updated based on a change to the input. The change may comprise insertion, deletion, or replacement of at least a portion of the input. For example, an incomplete or partial input may be expanded. The relevant content may be updated to more closely match an expanded version of the incomplete or partial input. In an embodiment, steps 804-805 may be repeated in response to a change in the input to update and display the relevant content.

In some embodiments, the relevant content may be updated based on a change to the corresponding content. In an example, text of a corresponding content item may be changed in the database. Text of relevant content based on the corresponding content item may be updated and displayed. In another example, a metric such as number of clicks, views, or upvotes for a corresponding content item may be changed in the database. Order or ranking of relevant content based on the corresponding content item may be updated and displayed. In an embodiment, steps 804-805 may be repeated in response to a change in the corresponding content to update and display the relevant content.

Figure 9:
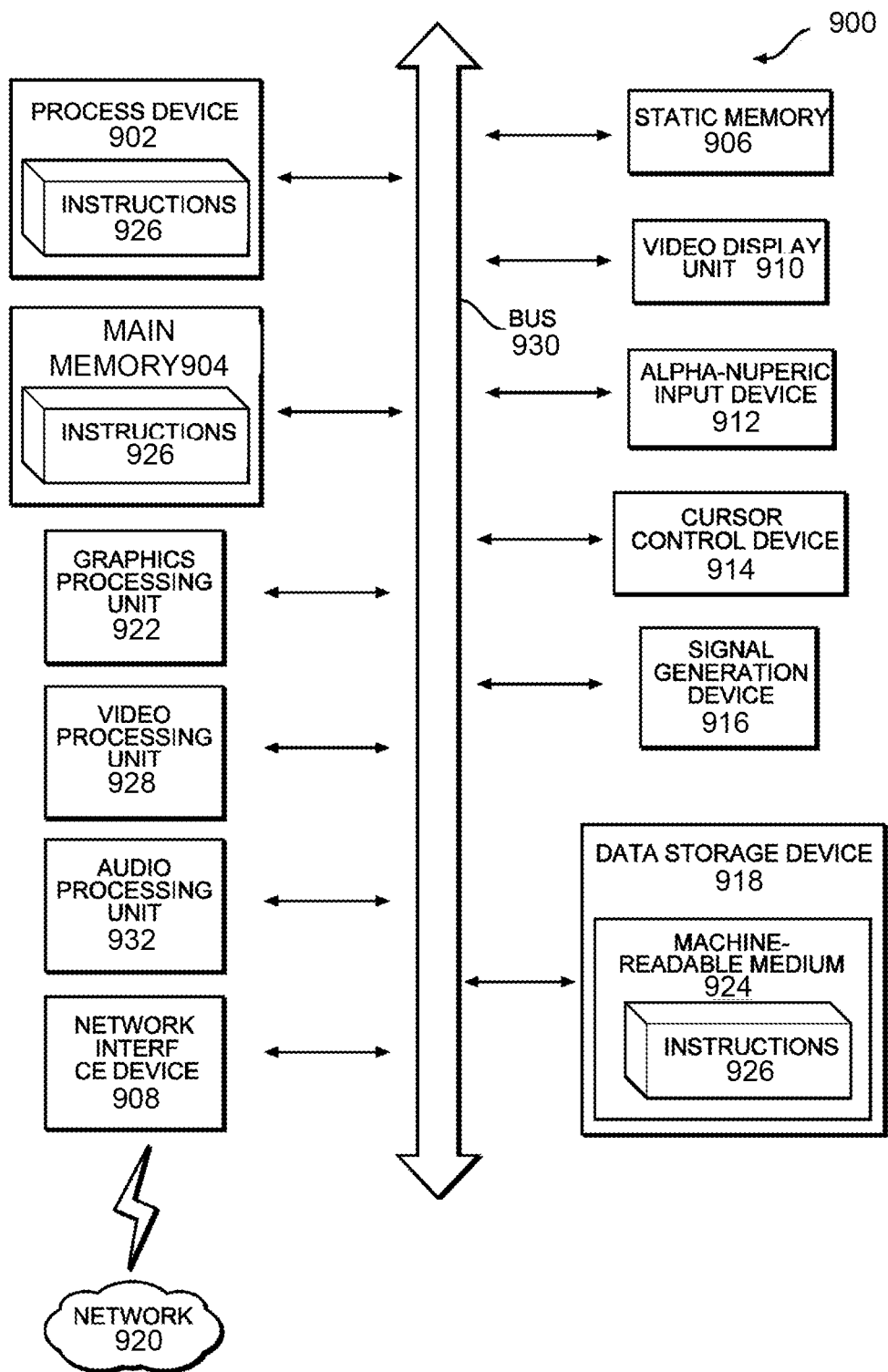
FIG. 9 illustrates an example computer system for use in some embodiments.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 915 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to the components of a device to perform the disclosure herein. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   retrieving a portion of source code, the portion of source code including a function having one or more parameters and one or more return values, and the portion of source code including one or more tokens;
   automatically generating a docstring for the function using a machine learning model based on an input to the machine learning model of at least the one or more tokens to determine a type of the one or more parameters and the one or more return values, wherein the generated docstring includes a determined type for each of the one or more parameters of the function and a type for each of the one or more return values of the function; and
   inserting the generated docstring in the source code.

2. The computer-implemented method of claim 1, further comprising analyzing one or more usages of the function in the source code to infer a return type of the function.

3. The computer-implemented method of claim 1, wherein the machine learning model is a neural network.

4. The computer-implemented method of claim 1, further comprising analyzing one or more usages of the function in the source code to infer a type of at least one parameter of the function.

5. The computer-implemented method of claim 1, further comprising:
   detecting entry of a change in the source code to a return value or at least one parameter of the function;
   updating the docstring based on the change in the source code to the return value or at least one parameter of the function.

6. The computer-implemented method of claim 1, further comprising: using documentation or code from referenced entities to generate the docstring.

7. The computer-implemented method of claim 1, further comprising:
   identifying an application programming interface (API) call in the function definition;
   detecting a change to a parameter or return value of the API call;
   updating the docstring based on the detected change to the parameter or return value of the API call.

* * * * *